W. R. FINLAY.
DEMOUNTABLE RIM.
APPLICATION FILED FEB. 12, 1917.

1,284,633.

Patented Nov. 12, 1918.

WITNESS:

INVENTOR.
William R. Finlay
BY
ATTORNEYS.

UNITED STATES PATENT OFFICE.

WILLIAM R. FINLAY, OF SAN FRANCISCO, CALIFORNIA.

DEMOUNTABLE RIM.

1,284,633.  Specification of Letters Patent.  Patented Nov. 12, 1918.

Application filed February 12, 1917. Serial No. 148,004.

*To all whom it may concern:*

Be it known that I, WILLIAM R. FINLAY, a citizen of the United States, residing in the city and county of San Francisco and State of California, have invented certain new and useful Improvements in Demountable Rims, of which the following is a specification.

The hereinafter described invention relates to a demountable rim for the attachment of solid tires to the ordinary rim adapted for the reception of pneumatic tires, whereby the rim now in use may be employed for the reception of the present invention without changes or alteration being made therein.

The invention is especially designed for applying solid tires to the wheels of motor driven delivery vehicles, to trailers usually associated with motor vehicles for the delivery of goods, and equally so to the lighter types of auto-trucks, and the object of the invention is the production of a rim carrying a solid tire which may be quickly and easily applied to the rim of an ordinary wheel for automobiles and trailers and this without changing or varying the construction of the rim mounting for said wheels, the construction of the demountable rim carrying the solid tire being such as to permit of being applied to the rim of the wheel and securely held thereto without the utilization of means for bolting or fastening the same to the wheel structure, as is usually the case in applying a demountable rim to the wheel structure.

To comprehend the invention, reference should be had to the accompanying sheet of drawings, wherein—

Figure 1:
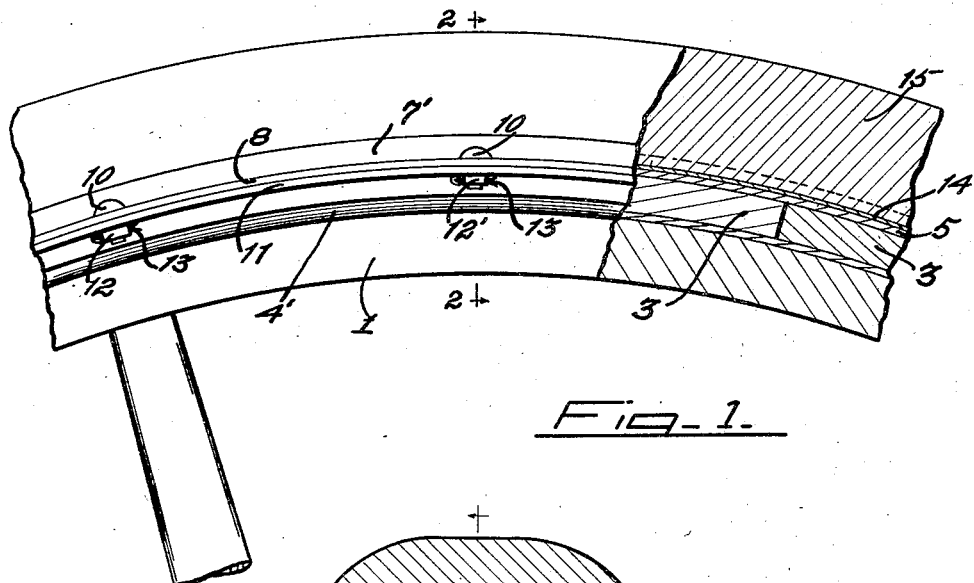
Figure 1 is a broken part sectional side elevation of an ordinary clencher rim with the solid tired demountable rim applied thereto.

In the drawings, the numeral 1 designates the wooden felly of an ordinary automobile wheel carrying a clencher rim 2. In the application of the invention to this type of rimmed wheel, a segmental filler block 3 is inserted circumferentially of the rim 2, so as to close the space and produce a circumferential bearing surface 3' intermediate the side wall flanges 4 and 4' of the clencher rim for the reception and support of the demountable rim member for the solid tire.

In the present case the demountable rim comprises a body portion 5 of a width equal to that of the clencher rim, which said body portion is formed with the upstanding circumferential flange wall members 6 and 6', the wall member 6 being bent backwardly upon itself to provide a return flange member 7 which projects beyond the under surface of the flange 4 so as to partly embrace the outer wall member 4 of the rim 2, which said rim is attached to the felly 1 in the usual manner. The opposing wall member 6 of the body member 5 of the demountable rim is bent backwardly upon itself to provide a return flange member 7', which terminates in an outwardly projected lock flange member 8 lying at substantially right angles to the member 7. The flange member 8 is provided at intervals throughout its circumference with bolt openings 9, through which are passed securing bolts 10 for uniting the same to the circumferential angle plate 11, which constitutes the lock ring member for the demountable rim, the inner flange wall thereof embracing the inner wall member 4' of the clencher rim 2. The bolts 10 pass through bolt openings formed in the lock ring 11 and are secured in place by nuts 12 screwed thereon and held against working loose by the cotter pins 13.

Figure 2:
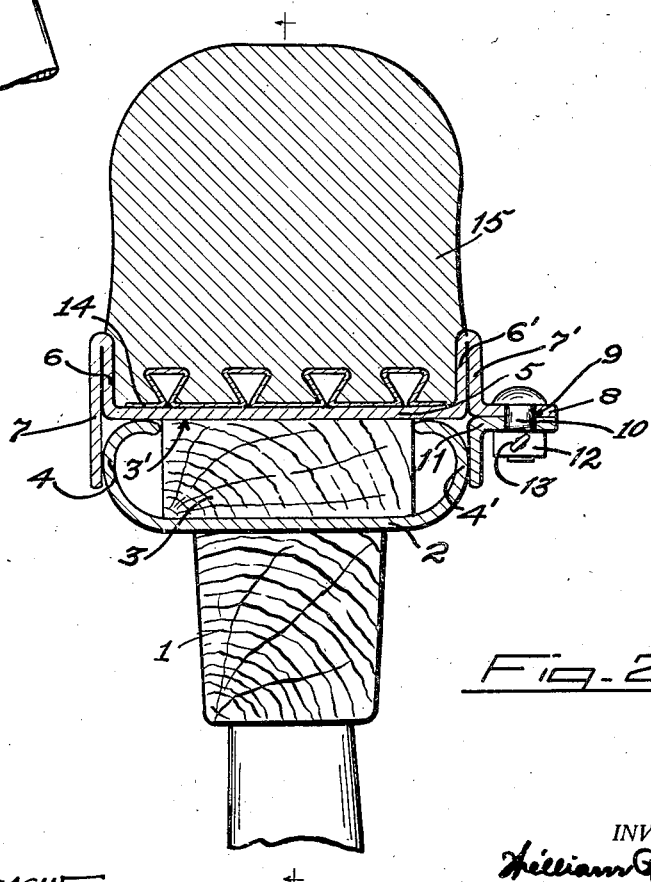
Fig. 2 is a transverse sectional elevation taken on the line 2—2 Fig. 1 of the drawings and viewed in the direction of the arrows.

Within the demountable rim is situated the anchor or anchor plate 14, preferably shaped as shown in Fig. 2 of the drawings, to which is molded or otherwise connected the solid rubber or composition tire 15, which with its anchor or anchor plate 14 is fitted to the demountable rim in any suitable manner to be partly embraced by and held between the side flanged wall members 6 and 6' of the said rim.

In fitting the demountable rim with its solid tire 15 to the rim 2, the said rim is slipped over the fixed rim 2 and the filler block 3 until the inner wall of the flange member 7 of the demountable rim bears firmly against the outer face of the member 4 of the rim 2. The lock ring angle member 11 is then positioned to bear against the outer surface of the side wall member 4' of the fixed rim 2 and the under surface of the flange member 8 of the demountable rim, when the bolts 10 are inserted and the parts tightened by the application of the nuts 12 to the fastening bolts. The tightening of the bolts 10 draws the lock ring angle member securely in place against the wall member 4' of the fixed rim 2 and thus firmly attaches the demountable rim with its solid tire 15 to the wheel to be tired.

In order to remove the demountable rim it is only required to disconnect the lock ring angle member 11, when the rim is free to be slipped from off of the wheel.

It is thus apparent from the foregoing that no fastening means are employed which are required to connect with the wheel structure or the rim member held thereto, hence the demountable rim with its solid tire is adapted for attachment to any of the ordinary wheels designed for vehicles employing demountable rim structures.

The described demountable rim may be attached to and detached from a wheel member quickly and within a comparatively short time, inasmuch as only such time is required as is necessary to bolt or release the lock ring member 11 relative to the flanged lock member 8 of the demountable rim.

The invention readily lends itself to the equipping of motor driven delivery wagons, trailers and light trucks with solid resilient tires, providing, as it does, an efficient, simple, and quickly demountable attachment capable of use without the employment of specially designed wheels for receiving the same.

Having thus described my invention, what I claim as new and desire to protect by Letters Patent is:—

A solid tire carrying demountable rim for positioning over a clencher rim when the tire is removed therefrom comprising an annular body portion provided at its opposite side edges with integral parallel spaced peripheral tire retaining flanges arranged at right angles to the body portion, one of said flanges being provided with an integral extension lying substantially parallel with the outer surface of its coöperating flange and at right angles inwardly relatively to said body portion for engaging one side of said clencher rim to limit the movement of said demountable rim thereover, and the other of said flanges provided with an outwardly extended portion lying at substantially right angles to its coöperating flange, an angular locking member for engaging the inner peripheral surface of said outwardly extended portion and for contacting with the side of said clencher rim opposite to that engaged by said integral extension, and securing means coöperating with said outwardly extended portion and said locking ring for uniting the same to retain the demountable rim in position on said clencher rim.

In testimony whereof I have signed my name to this specification in the presence of two subscribing witnesses.

WILLIAM R. FINLAY.

Witnesses:
N. A. ACKER,
D. B. RICHARDS.